(12) United States Patent
Blomqvist (10) Patent No.: US 9,958,270 B2
(45) Date of Patent: May 1, 2018

(54) VIBRATORY GYROSCOPE

(71) Applicant: MURATA ELECTRONICS OY, Vantaa (FI)

(72) Inventor: Anssi Blomqvist, Helsinki (FI)

(73) Assignee: MURATA MANUFACTURING CO., LTD., Kyoto (JP)

( * ) Notice: Subject to any disclaimer, the term of this patent is extended or adjusted under 35 U.S.C. 154(b) by 170 days.

(21) Appl. No.: 13/928,879

(22) Filed: Jun. 27, 2013

(65) Prior Publication Data
US 2014/0000366 A1 Jan. 2, 2014

(30) Foreign Application Priority Data
Jun. 29, 2012 (FI) .................................... 20125758

(51) Int. Cl.
| | |
|---|---|
| G01C 19/56 | (2012.01) |
| G01C 19/5726 | (2012.01) |
| G01C 19/5776 | (2012.01) |
| G01C 25/00 | (2006.01) |

(52) U.S. Cl.
CPC ......... *G01C 19/56* (2013.01); *G01C 19/5726* (2013.01); *G01C 19/5776* (2013.01); *G01C 25/00* (2013.01); *Y10T 29/49002* (2015.01)

(58) Field of Classification Search
CPC G01C 19/5726; G01C 19/5776; G01C 19/56; G01C 19/5684; G01C 19/5719; G01C 25/00; Y10T 29/49002; H03B 5/30
See application file for complete search history.

(56) References Cited

U.S. PATENT DOCUMENTS

| | | | | |
|---|---|---|---|---|
| 4,958,519 | A * | 9/1990 | Whaley | G01C 19/5607 73/504.16 |
| 6,860,150 | B2 * | 3/2005 | Cho | 73/504.12 |
| 7,441,459 | B2 * | 10/2008 | Ohuchi | G01C 19/5607 73/504.12 |

(Continued)

FOREIGN PATENT DOCUMENTS

| | | |
|---|---|---|
| CN | 1211725 A | 3/1999 |
| CN | 1571915 A | 1/2005 |

(Continued)

OTHER PUBLICATIONS

Wu, Henry, "System Architecture for Mode-Matching a MEMS Gyroscope", Massachusetts Institute of Technology, Jun. 2009.*

(Continued)

*Primary Examiner* — Peter Macchiarolo
*Assistant Examiner* — Irving A Campbell
(74) *Attorney, Agent, or Firm* — Squire Patton Boggs (US) LLP (57) ABSTRACT

A sensing device comprising a micromechanical gyroscope, the gyroscope comprising an improved sensing device with a micromechanical gyroscope, where the resonance frequency of the first mechanical resonator and the resonance frequency of the second mechanical resonator are adjusted to essentially coincide. The device comprises a feed-back loop connected to the second mechanical resonator, the quality factor of the combination of the feed-back loop and the second mechanical resonator being less than 10. More accurate sensing is achieved without essentially adding complexity to the sensor device configuration.

8 Claims, 6 Drawing Sheets

(56) References Cited

U.S. PATENT DOCUMENTS

| | | | |
|---|---|---|---|
| 2006/0117849 | A1 | 6/2006 | Gallon et al. |
| 2008/0126015 | A1* | 5/2008 | Hammerschmidt ... G01C 19/56 702/189 |
| 2010/0253437 | A1* | 10/2010 | Seeger et al. ............. 331/18 |
| 2013/0104656 | A1 | 5/2013 | Smith |

FOREIGN PATENT DOCUMENTS

| | | | |
|---|---|---|---|
| CN | 102230800 | A | 11/2011 |
| CN | 102498365 | A | 6/2012 |
| KR | 20050082097 | A | 8/2005 |
| TW | 200416394 | A | 9/2004 |
| TW | 201102616 | A | 1/2011 |

OTHER PUBLICATIONS

Baxter, L.K., "Capacitive Sensors", Jul. 20, 2000.*

International Search Report international application No. PCT/FI2013/050712 dated Oct. 28, 2013.

Finnish Search Report dated Jun. 4, 2013 corresponding to Finnish Patent Application No. 20125758.

Chunhua He et al., "A Research of the Bandwidth of a Mode-Matching MEMS Vibratory Gyroscope," In: 7th IEEE International Conference on Nano/Micro Engineered and Molecular Systems (NEMS), Mar. 2012, IEEE 2012, pp. 738-741.

Chihwan Jeong et al., "A Study on Resonant Frequency and Q Factor Tunings for MEMS Vibratory Gyroscopes," Journal of Micromechanics and Microengineering, Nov. 2004, vol. 14, No. 11, pp. 1530-1536.

Patent Office of the People's Republic of China, Search Report for corresponding Chinese Patent Appln. No. 201380031839.5, Aug. 16, 2016.

Taiwan Patent Office, Search Report corresponding to Taiwanese Patent Appln. No. 102123161, Dec. 13, 2016.

European Patent Office, Search Report corresponding to Application No. 17 18 4146, dated Dec. 11, 2017.

* cited by examiner

VIBRATORY GYROSCOPE

FIELD OF THE INVENTION

The present invention relates to microelectromechanical devices and especially to a sensor device and a method for sensing angular velocity, as defined in the preambles of the independent claims.

BACKGROUND OF THE INVENTION

Micro-Electro-Mechanical Systems, or MEMS can be defined as miniaturized mechanical and electro-mechanical systems where at least some elements have some mechanical functionality. Since MEMS devices are created with the same tools used to create integrated circuits, micromachines and microelectronics can be fabricated on the same piece of silicon to enable machines with intelligence.

MEMS structures can be applied to quickly and accurately detect very small changes in physical properties. For example, a microelectromechanical gyroscope can be applied to quickly and accurately detect very small angular displacements. Motion has six degrees of freedom: translations in three orthogonal directions and rotations around three orthogonal axes. The latter three may be measured by an angular rate sensor, also known as a gyroscope. MEMS gyroscopes use the Coriolis Effect to measure the angular rate. When a mass is moving in one direction and rotational angular velocity is applied, the mass experiences a force in orthogonal direction as a result of the Coriolis force. The resulting physical displacement caused by the Coriolis force may then be read from a capacitively or piezoresistively sensing structure.

In MEMS gyros the primary motion cannot be continuous rotation as in conventional ones due to a lack of adequate bearings. Instead, mechanical oscillation may be used as the primary motion. When an oscillating gyroscope is subjected to an angular motion orthogonal to the direction of the primary motion, an undulating Coriolis force results. This creates a secondary oscillation orthogonal to the primary motion and to the axis of the angular motion, and at the frequency of the primary oscillation. The amplitude of this coupled oscillation can be used as the measure of the angular rate.

A vibratory gyroscope operates on the principle of coupling of a primary mode vibration to a secondary mode vibration by Coriolis force induced by rotation of a body to which the gyroscope is attached. The operation of the gyroscope is strongly dependent on how the resonant frequency of the resonator for the primary mode vibration (primary frequency) and the resonant frequency of the resonator for the secondary mode vibration (secondary frequency) are selected in respect of each other. When the frequencies are far apart, the gyroscope is less sensitive to external vibrations and shows good stability over environmental changes e.g. temperature and time, but the detected amplitude is relatively low. The generated signal may be amplified electrically, but at the same time noise is amplified, so the signal-to-noise ratio tends to be very low. When the frequencies are closer, Coriolis movement is amplified by the gain of the secondary resonator, and better signal-to-noise ratio is achieved. However, at the same time, sensitivity to various external and internal factors increases. For many of these factors, sensitivity may be managed by added mechanical structures or electrical circuitry in the sensing device. However, such arrangements typically lead to added size and reduced robustness of the device.

BRIEF DESCRIPTION OF THE INVENTION

The object of the present invention is to enable more accurate sensing with a microelectromechanical gyroscope without essentially adding complexity to the sensor device configuration. The objects of the present invention are achieved with a sensor device and a method according to the characterizing portions of the independent claims.

The preferred embodiments of the invention are disclosed in the dependent claims.

The present invention is based on the idea of applying the resonance gain by letting the primary and the secondary frequencies coincide to improve the signal levels output from the secondary resonator. The secondary resonator is controlled with a very strongly damping feed-back loop. A significant improvement to signal levels may then be achieved with minimal amount of device components.

BRIEF DESCRIPTION OF THE FIGURES

In the following the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of sensor devices and methods that are generally known to a person skilled in the art may not be specifically described herein.

Figure 1:
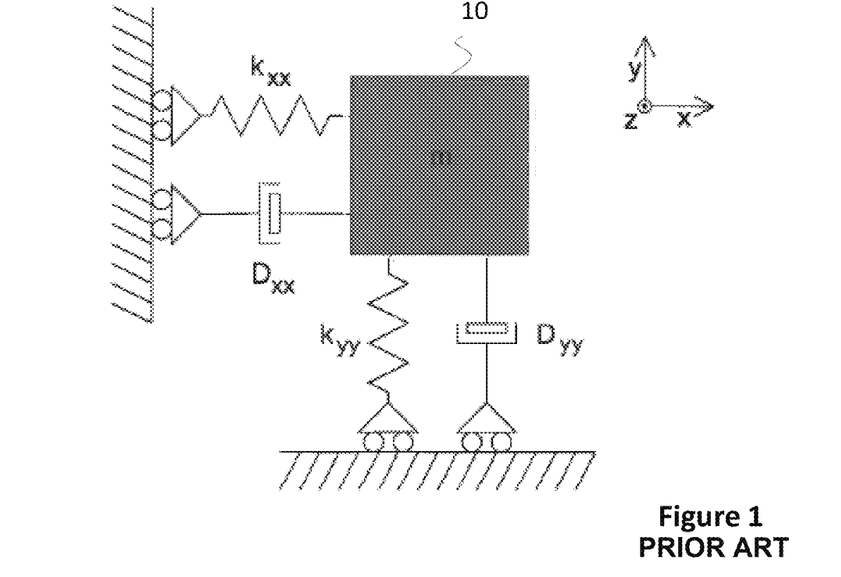
FIG. 1 shows a diagram of a 2-degree-of-freedom (DoF) mechanical resonator.

To establish the applied concepts and terms, FIG. 1 shows a diagram of a prior art 2-degree-of-freedom (DoF) mechanical resonator, as depicted in prior art (for example: "System and circuit design for a capacitive MEMS gyroscope" of Mikko Saukoski). The 2-DoF structure of FIG. 1 comprises two 1-DoF resonators, one formed by a mass 10, a spring $k_{xx}$ and a damper $D_{xx}$ in the direction of the x-axis, and the other formed by the mass 10, a spring $k_{yy}$ and a damper $D_{yy}$ in the direction of the y-axis. In a micromechanical sensor of angular velocity the x-directional resonator may be called a primary resonator or the drive resonator. It is typically excited with an external force at its resonance frequency, called the operating frequency. The y-directional resonator may be called a secondary resonator or the sense resonator. When an angular velocity is applied about the z-axis, a corresponding Coriolis force may be detected in the secondary resonator. In the function diagram of FIG. 1 the masses of the primary and the secondary resonators are identical. Depending on the configuration, the masses of the primary resonator and the secondary resonator may also be different.

Figure 2:
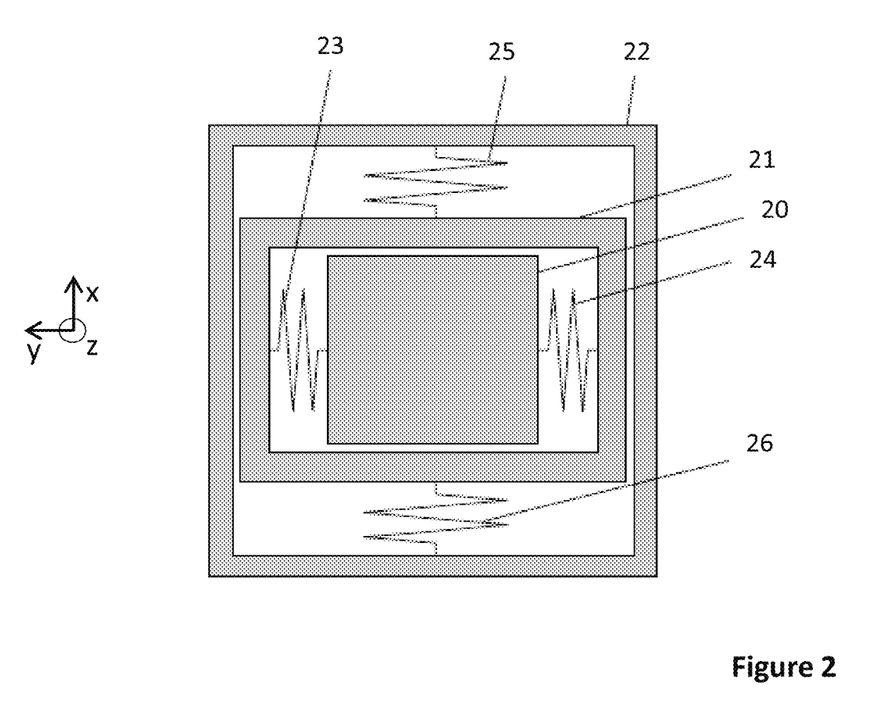
FIG. 2 illustrates configuration of an exemplary micromechanical gyroscope.

FIG. 2 illustrates configuration of an exemplary micromechanical gyroscope that comprises a mass 20, supported at an activation frame 21 in the direction of the y-axis by means of springs 23, 24. Said activation frame 21 is further supported at a support structure 22 in the direction of the x-axis by means of springs 25, 26. In the illustrated gyroscope, the mass 20 in the middle, and the activation frame 21 surrounding it, may be activated into a vibratory primary motion in the direction of the x-axis, enabled by the springs 25, 26. The detection axis formed in the direction of the y-axis by means of the spring suspension 23, 24 of the mass 20 to the activation frame 21, is perpendicular to the primary motion. When the structure that vibrates in the primary motion is rotated in relation to the Z-axis perpendicular to the surface xy-plane, the mass 20 in primary motion experiences a Coriolis force in the direction of the y-axis. The detection springs 23, 24, define the amplitude and phase of the vibration of the induced detection motion.

Figure 3:
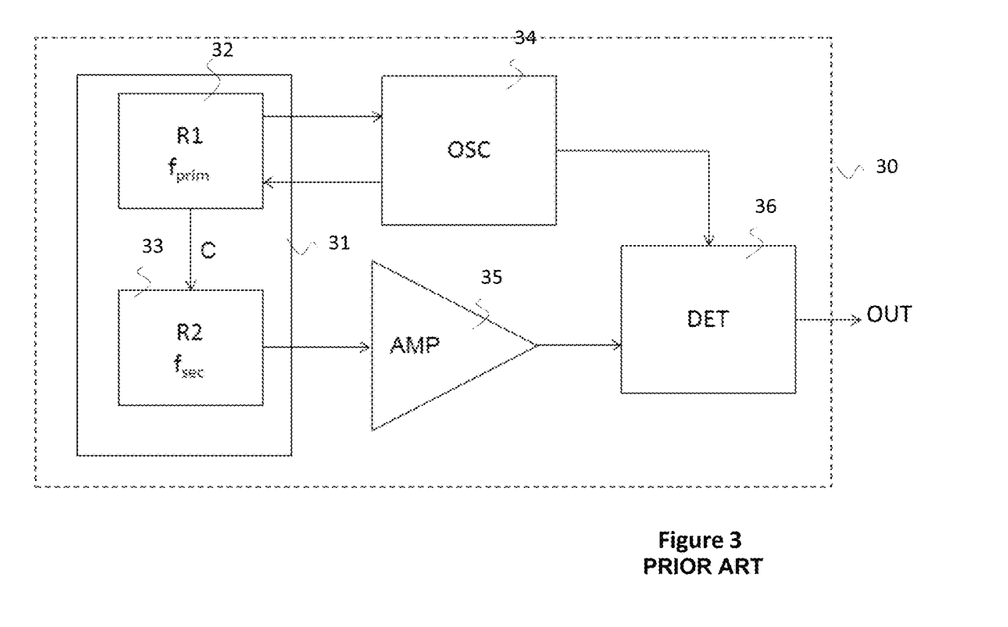
FIG. 3 illustrates configuration of an exemplary microelectromechanical sensor device.

FIG. 3 illustrates configuration of an exemplary prior art microelectromechanical sensing device 30. The device comprises a micromechanical gyroscope 31 that comprises a first mechanical resonator 32 for drive mode vibration (primary motion), and a second mechanical resonator 33 that is coupled to the first mechanical resonator to produce associated sense mode vibration (secondary motion) in a direction that is perpendicular to the direction of the drive mode vibration. Drive mode vibration may be implemented and controlled, for example, with a primary oscillator circuit 34 that generates an oscillating electrical signal and a transducer (not shown) that converts the electrostatic energy input to the first mechanical resonator 32 to mechanical drive mode vibration in the primary resonator.

The coupling between the first mechanical resonator and the second mechanical resonator causes a sense mode vibration in the second mechanical resonator 33 that may be converted to electrical signals with a transducer (not shown). The electrical signals output from the secondary resonator that correspond to the sense mode vibration may be amplified with an amplifier 35. The configuration of the exemplary micromechanical sensor device of FIG. 3 applies synchronous detection where electrical signals from the primary oscillator circuit as well as the amplifier are fed into a synchronous detector 36 that generates the output of the sensor device. When the micromechanical sensor device is rotated, the drive mode vibration of the gyroscope couples with the sense mode vibration via Coriolis force, and the electrical signal received from the second mechanical resonator corresponds to Coriolis force and thus to angular velocity of the device.

Figure 4:
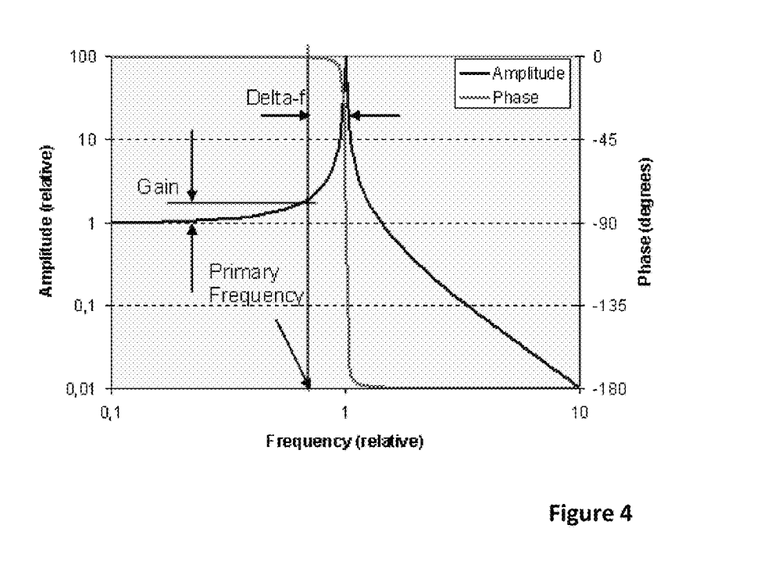
FIG. 4 shows exemplary amplitude and phase transfer functions of an exemplary mechanical resonator.

The operation of the gyroscope is strongly dependent on how the resonant frequency $f_{prim}$ of the first mechanical resonator (primary frequency) and the resonant frequency $f_{sec}$ of the second mechanical resonator (secondary frequency) are located in respect of each other. FIG. 4 shows amplitude and phase transfer functions of an exemplary mechanical resonator. The difference between the primary frequency and secondary frequency of a micromechanical gyroscope is called herein delta frequency or delta-f.

In conventional gyroscopes the primary frequency has been selected to be lower than the secondary frequency, and delta-f quite large, in the order of 1 to 2 kHz. From FIG. 4 it may be seen that when delta-f of the gyroscope is very large, the primary frequency is in the flat part of the secondary resonator transfer function. When the primary and the secondary frequencies are brought closer to each other, the Coriolis movement starts to get amplified by the gain of the secondary resonator. The gain depends basically only on the delta-f, assuming that the quality factor (Q-value) of the secondary resonator is high enough. When the resonance frequencies are brought close enough to each other, the gain starts saturating to the value determined by the quality factor of the secondary resonator.

In an ideal structure, resonance gain could be fully utilized for optimal sensitivity and resolution by simply minimizing the difference between the primary and secondary frequencies. Real-world structures are not, however ideal and influence of some of these non-idealities are quite strongly dependent on the delta-f.

For example, when delta-f is reduced, the Coriolis movement and thus resonance gain increases, but at the same time sensitivity to variations in the delta-f increases. In MEMS gyroscopes it is very difficult to manufacture structures where the delta-f between the primary and secondary frequencies remains perfectly stable over temperature and aging effects. Appropriate tracking of the primary and secondary frequencies may be provided by additional signal processing circuitry in the sensor device, but such complex configurations tend to be bulky and reduce robustness of the device.

There are also other reasons why higher values of delta-f have been conventionally applied, despite the known loss in resonance gain. Another mechanism that disturbs detection is vibration at the delta-f frequency. Angular vibration at delta-f on the detection axis will couple to the secondary resonator via Coriolis-force and modulate the primary frequency so that a sideband occurs exactly at the secondary resonance frequency. This occurs because the Coriolis term contains a multiplication of the primary signal velocity and the angular rate signal. If the signal from the secondary resonator (secondary channel) is demodulated by synchronous detection, the frequency response of the gyroscope will have a peak at the delta-f frequency. One way to avoid this has been to design delta-f as large as possible and to decrease the mechanical quality factor (mechanical Q-value) of the secondary resonator. Naturally, the delta-f resonance may be filtered from the sensor output provided that the delta-f is designed significantly higher than the bandwidth of the sensor.

In addition, due to imperfections in gyroscope manufacturing there will be always a direct mechanical coupling from the primary resonator to the secondary resonator. This coupling is proportional to the amplitude of the primary motion whereas the coupling by Coriolis force is proportional to the velocity. Therefore the direct mechanical coupling has a 90 degrees phase shift compared to the Coriolis signal and is called quadrature signal.

The zero-point stability of a gyroscope is largely dependent on the quadrature signal level and phase stability between the detected primary oscillation and the transfer function of the secondary resonator. If there is a phase change $\Delta\varphi$ in the secondary channel then the resulting zero point change of the angular rate output is;

$$\Delta\Omega = \sin(\Delta\varphi) \cdot QS \quad (1)$$

where QS is the quadrature signal expressed in equivalent angular rate units. The transfer function of the secondary resonator is then:

$$H_m(s) = \frac{1}{1 + \frac{s}{Q_m} + s^2} \quad (2)$$

where $Q_m$ is the mechanical quality factor of the secondary resonator. Frequency has been normalized so that the secondary resonance frequency $\omega_0 = 2\pi f_0 = 1$ and s is the normalized frequency (imaginary number).

The phase shift of equation (2) at primary frequency depends on the normalized primary frequency $\omega$ and $Q_m$:

$$\varphi = \arctan\left(\frac{\omega}{Q_m(1 - \omega^2)}\right) \quad (3)$$

Phase changes that can affect the zero point stability according to equation (1) may be caused by change of the mechanical Q-value or of the normalized primary frequency. A common cause for phase change in conventional gyros is the temperature dependency of secondary Q-value, which is typically ~30% over temperature range. A change of the normalized frequency is due to non-tracking of the primary frequency and secondary resonance frequency. This can be due to excess drift in either of them due to e.g. electrostatic effect or mechanical stress. Phase change may also be due to frequency response instability of the electrical components in the secondary or primary detection circuits, which are not governed by equation (3).

If the frequency tracking error (change of the normalized primary frequency) is $\Delta\omega$, then the ratio of the corresponding phase error $\Delta\varphi$ to $\Delta\omega$ in the secondary channel is:

$$\frac{\Delta\varphi}{\Delta\omega} = \frac{1 + \omega^2}{(1 - \omega^2)^2 + \frac{1}{Q_m^2}\omega^2} \cdot \frac{1}{Q_m} \quad (4)$$

where $\omega$ is again the normalized primary frequency. For the case $\omega = \omega_0 = 1$, i.e. the primary and secondary frequencies are matched (or nearly matched), the equation is reduced to $$\frac{\Delta\varphi}{\Delta\omega} = 2Q_m \quad (5)$$

If the primary and secondary resonance frequencies are far apart then the equation is reduced to $$\frac{\Delta\varphi}{\Delta\omega} = \frac{1 + \omega^2}{(1 + \omega^2)} \cdot \frac{1}{(1 - \omega)^2 Q_m} \quad (6)$$

The conclusion is that if the secondary frequency is very close to the primary frequency, even a small change in the normalized primary frequency $\Delta\omega$ will cause a very large phase shift according to equation (5). Conventionally, the frequencies are thus apart and the larger the frequency separation $(1-\omega)$ and the larger the mechanical Q-value, the smaller the phase shift error is, as shown by equation (6). The Q-value cannot, however, be increased limitlessly, because at the same time vibration sensitivity increases. An exemplary practical number for the ratio in equation (6) is 0.17, which is achieved by setting $Q_m = 300$ and $\omega = 0.9$.

Figure 5:
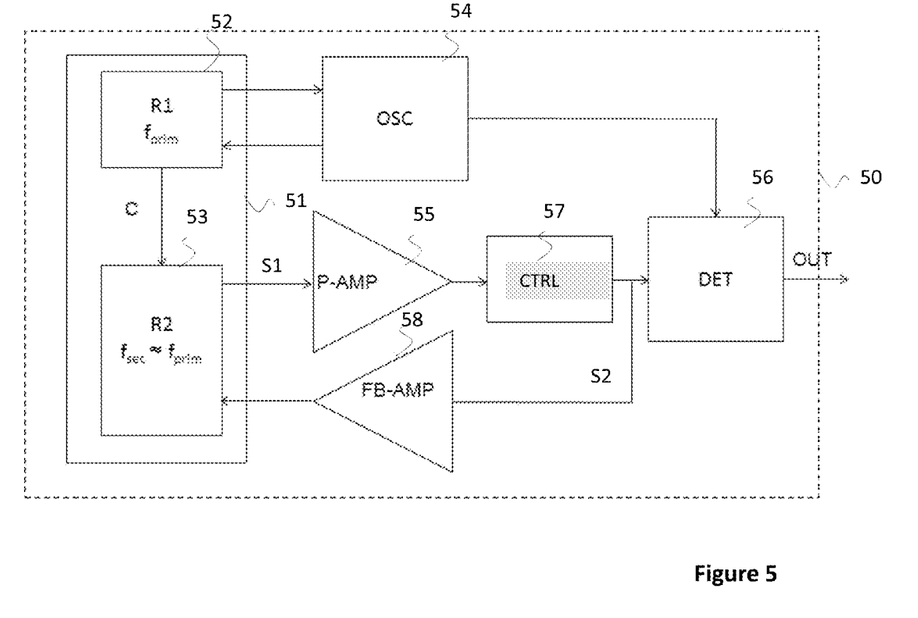
FIG. 5 shows a block diagram that illustrates an embodiment of a micromechanical sensing device configuration.

FIG. 5 shows a block diagram that illustrates an embodiment of a micromechanical sensing device 50 configuration by means of which improved performance may be achieved with minimal additional electric circuitry. Elements already described in connection with FIG. 3 are denoted with corresponding reference numbers, beginning with 5, including a micromechanical gyroscope 51, a first mechanical resonator 52, a second mechanical resonator 53, an oscillator 54, pre-amplifier 55, and a synchronous detector 56. In addition to the configuration of FIG. 3, the present micromechanical sensing device comprises a feed-back loop connected to the second mechanical resonator and adjusted to damp the sense mode vibration of this secondary resonator of the gyroscope.

For damping the feed-back loop comprises a transducer element (within the second resonator, not shown) and a controlling element 57. The feed-back loop may also comprise a feed-back amplifier 58 to amplify the feed-back signal to an appropriate level.

A transducer refers here to a device that converts one form of energy to another. For example, a sensor is a device or system that detects a physical property and converts it into a measurable signal. Typically the physical property manifests itself as one form of energy and is converted in the sensor to another form of energy with a transducer device. The physical property and the means for detecting the form of energy may vary according to the application. In one category of devices, a characteristic representing a detected physical property may comprise detection or induction of displacement of a reference point with respect of an inertial frame of reference. The displacement may be detected or inducted, for example, as movement of a suspended proof-mass, or stress or strain exerted on a transducer element connected to the elastic suspension that carries the proof-mass. A detected motion, stress or strain may be used to modulate electrical signals, which makes the physical property quite accurately measurable. As another example, in actuators, transducers may be used to convert electromagnetic energy into some form of motion, stress or strain.

A transducer in the present embodiment may be modeled with a mass-spring system where the mass is suspended on the spring to a body in such a manner that a force exerted to the mass, or acceleration of the body causes a proportional displacement to the mass. By means of electric circuitry, movement of the mass may be detected and transformed into measurable electrical signals. A mass-spring system is in an equilibrium state when the body is static and no net force acts on the mass. If the system is displaced from the equilibrium, the spring causes a net restoring force on the mass, tending to bring it back to equilibrium. However, in moving back to the equilibrium position, the mass acquires a momentum which keeps it moving beyond that position, establishing a new restoring force in the opposite sense. Hence, the mass begins to oscillate about the equilibrium state. The mass may be biased and its movement in respect of static electrodes then converted to an electrical signal. The harmonic oscillations of the mass thus transform into alternating electrical signals that represent movement of the body with respect to an inertial frame of reference.

Figure 6:
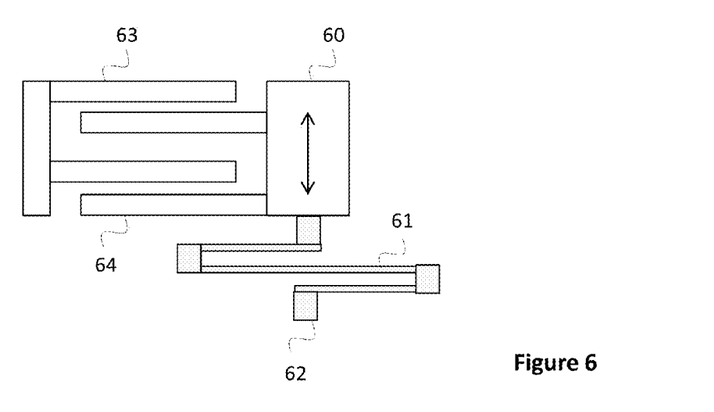
FIG. 6 shows a simplified example of a mass-spring system applicable for transducing displacements into electrical signals.

FIG. 6 shows a simplified example of a mass-spring system applicable for transducing displacements into electrical signals. The second resonator is represented now with a 1-DoF system that has a proofmass 60 and a spring element 61 coupled to the primary resonator (not shown). The system may have one or more stationary electrodes 63 anchored to the body of the sensor and one or more movable electrodes 64 connected to the motion of the proofmass 60. The transducer for measuring the displacement in FIG. 6 may be based on a capacitive effect, wherein capacitance between electrodes 63 and 64 changes when the distance between them changes. This change in capacitance may be used to modulate an electrical signal output from the transducer. FIG. 6 also shows an output element 62 of the transducer that is coupled to the primary resonator.

Figure 7:
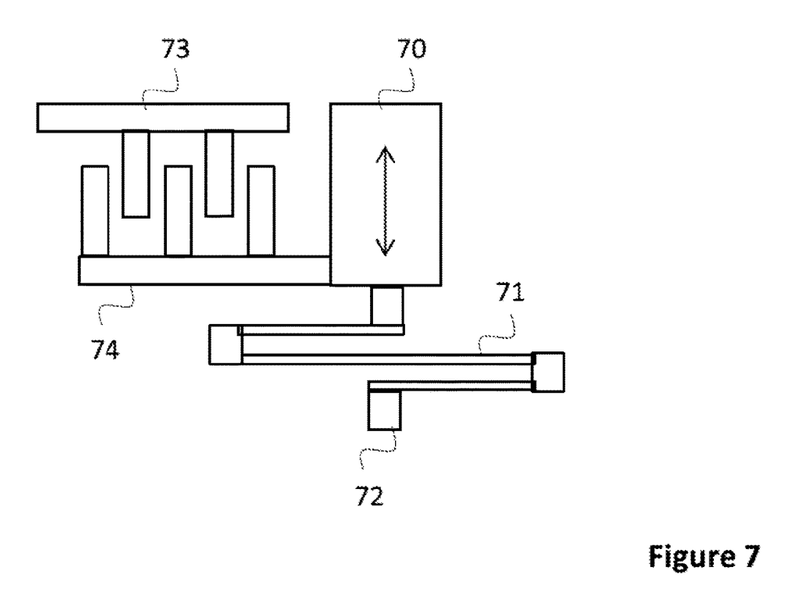
FIG. 7 shows another example of a mass-spring system applicable for transducing displacements into electrical signals.

FIG. 7 shows another type of capacitive transducer; same reference numerals are used to refer to corresponding elements in FIGS. 6 and 7. In the transducer of FIG. 7, modulation of the electrical signal corresponds to change in the overlapping areas of the electrodes 73 and 74. The transducers in FIGS. 6 and 7 measure displacement of a proof element 70 based on a capacitive effect, but other types of proof elements indicating, for example, strain or stress exerted on the proof element, and other types of effects, like piezoelectric, and electromagnetic effect that transform a detected indication of a physical property to an electrical signal may be applied. FIG. 7 also shows an output element 72 of the transducer that is coupled to the primary resonator.

Figure 8:
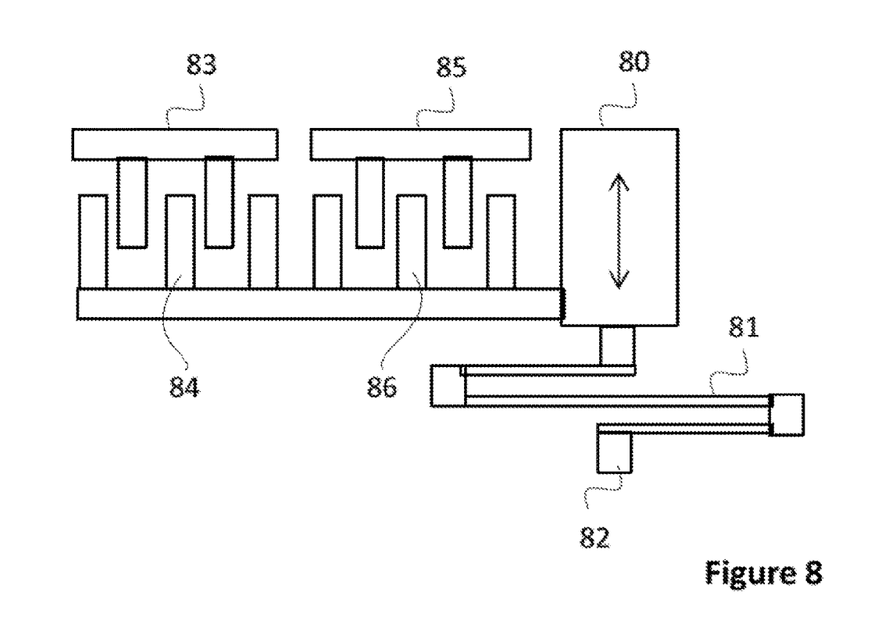
FIG. 8 shows a block diagram illustrating functional configuration of the exemplary second mechanical resonator.

In active electrical damping, a displacement generates in the first transducer an electrical signal, which is converted in the feed-back loop into a modified signal that controls the mechanical force to be exerted against the displacement to eliminate or at least reduce the detected movement. FIG. 8 shows a block diagram illustrating functional configuration of the exemplary second mechanical resonator 53 of FIG. 5.

The mechanical resonator of FIG. 8 comprises a proofmass 80, and a spring element 81 coupled to the primary resonator (not shown). The system has one or more stationary TR1 electrodes 83 and one or more movable TR1 electrodes 84 connected to the motion of the proofmass 80. These electrodes 83, 84 form a capacitive displacement measuring transducer. The system has also one or more stationary TR2 electrodes 85 and one or more movable TR2 electrodes 86 connected to the motion of the proofmass 80. These electrodes 83, 84 form a force generating electrostatic transducer. An Output element 82 is also included that is coupled to the primary resonator.

It is noted that FIG. 8 illustrates a transducer element based on capacitive and electrostatic effects, it is clear to everyone skilled in the art that the transducers may be based on any known transducer principle. For example, the first transducer may be configured to detect displacement by means of motion, stress or strain based on capacitive effect, piezoelectric effect, electromagnetic effect or piezoresistive effect. The second transducer may be configured to induce displacement by means of force, torque, stress or strain based on electrostatic effect, piezoelectric effect, electromagnetic effect, thermoelastic effect, electrostriction or magnetostriction.

A displacement of a proofmass in the second mechanical resonator 51 may be measured electrically with TR1 electrodes (83, 84 in FIG. 8) and converted to an electrical signal S1. The first electrical signal S1 may be amplified by an amplifier 55, and the amplified signal fed via a controller 57 to the forcing transducer TR2. TR2 may be configured to exert with TR2 electrodes to the proofmass a mechanical force that corresponds to the second electrical signal S2. S2 may then be fed to TR2 with such a phase relation to the detected displacement that movement of the proofmass is reduced by the applied force.

In the configuration of FIG. 5, the resonance frequency of the first mechanical resonator and the resonance frequency of the second mechanical resonator are initially adjusted to essentially coincide. Essential coincidence means herein that the frequency separation $(1-\omega)$ is in the range of 0 to 0.05. In addition, the control element is configured to transform the first electrical signal to a second electrical signal in such a manner that the quality factor of the feed-back resonator remains below 10. Advantageously the quality factor of the feed-back resonator is even smaller, preferably below 2. The quality factor of the first mechanical resonator and the open loop quality factor (loop with no feed-back) of the second mechanical resonator may be much higher, in the order of 100 or more.

Accordingly, in order to achieve an appropriate transfer function, efficient reduction of an element Q-value by means of the feed-back loop is necessary. Conventionally higher damping has been achieved by increasing the amplification of signal S2 in the feed-back loop, i.e. the so called loop gain that includes contributions from any amplifiers in the loop, the controller, the transducers, the frequency response of the mechanical resonator and the spring constant of the resonator spring element. However, while doing so, one has to take care that the closed loop transfer function remains stable at all conditions. When the controller has a conventional transfer function and when higher values of amplification are attempted, practical systems easily start to oscillate at a frequency that is considerably higher than the resonant frequency of the resonator.

In the present embodiment, required Q-value levels may be achieved by controlling the feed-back force against the detected motion with a signal processing filter. Advantageously, the signal processing filter functions as a resonator, and therefore peaks at a defined resonant frequency. Accordingly, the response function that defines correspondence between values of S1 and S2 is a frequency response function that has a resonant frequency characteristic that essentially coincides with the resonant frequency of S1.

In signal processing, a filter refers to a device or a process that completely or partially suppresses from a signal some unwanted component or feature. A signal processing filter (later: filter) with frequency response is configured to remove from a signal some frequencies and not others. The transfer function of the filter is a frequency response function that defines a relation between a signal that it inputs and a signal that it outputs, and cutoff frequency of the filter is a frequency after which the filter begins to attenuate or eliminate signals. Roll-off of the filter defines steepness of the response function with frequency after the cut-off frequency. It is known that roll-off tends towards a constant gradient at frequencies well away from the cut-off frequency. Roll-off can occur with decreasing frequency as well as increasing frequency, depending on the type of the filter. For example, a low-pass filter will roll-off with increasing frequency, but a high-pass filter will roll-off with decreasing frequency.

In the present embodiment, the signal processing filter may be a third resonator with a specific resonant frequency just before its cut-off frequency. As shown in FIG. 4, this means that the frequency response is very high at the resonant frequency of the filter and very steeply rolls-off with increasing frequency. In regions in the other side of the cut-off frequency (low-frequency response region), the response function is more even, but the difference to the resonance response is still considerable.

It has been discovered that the significant difference in the response of the filter for frequencies in and closely around the resonant frequency and for frequencies beyond them can be applied to avoid unwanted oscillations in the closed feed-back loop of the mechanical resonator. By means of this, a significantly higher level of damping may be achieved.

Attenuation of the resonator in the low-frequency response range is not needed since the main resonance to be damped is typically the lowest resonant frequency of the device. In order to eliminate adverse effects from unwanted phase shift in that region, amplification of the signal by the controlling resonator has to be controlled. Returning back to FIG. 5, the controlling element 57 in block chart may now be considered a third resonator. The second resonator 53 produces a first electrical signal S1, the frequency of which corresponds to sense mode vibration. S1 may be pre-amplified normally by a pre-amplifier 55, and the amplified signal fed to a third resonator 57. The third resonator generates according to its frequency response function a modified electrical signal S2. S2 may be amplified by the second amplifier and then fed to voltage-to-force transducer of R2 to define the amount of damping force to be exerted on R2.

In order to ensure that the damping occurs at an appropriate phase, the sign of the feed-back must be adjusted according to the type of the filter. Let us consider first a case where the controller 57 is a low-pass filter. The phase shift of the mechanical resonator at the resonant frequency is $-\pi/2$ and the phase shift of the low-pass filter is $-\pi/2$. For stable operation, the phase shift of the feed-back loop must be 0 or $-\pi$. This means that in the case of low-pass filter, the sign of the feed-back must be positive at low frequencies. It is then easily seen that in the roll-off region, the fast decrease in response levels ensures oscillation-free operation. It is, however, possible that positive feed-back cause instability in the low-frequency response region, here with the low-pass filter in the low frequency range.

In order to avoid instability by signals in the low frequency range, their amplification must be set low, preferably to values less than 1. It has been found that that by selecting the electrical Q-value of the low-pass filter to the range from 3 to 10, and designing the amplitude peak of the low-pass filter 57 essentially coincide with the resonant frequency of the second mechanical resonator R2, the amplification of R3 at low frequency can be reduced well below 1 and still the loop gain around the resonant frequency can be increased with the feed-back amplifier 58 high enough for very efficient damping.

Figure 9:
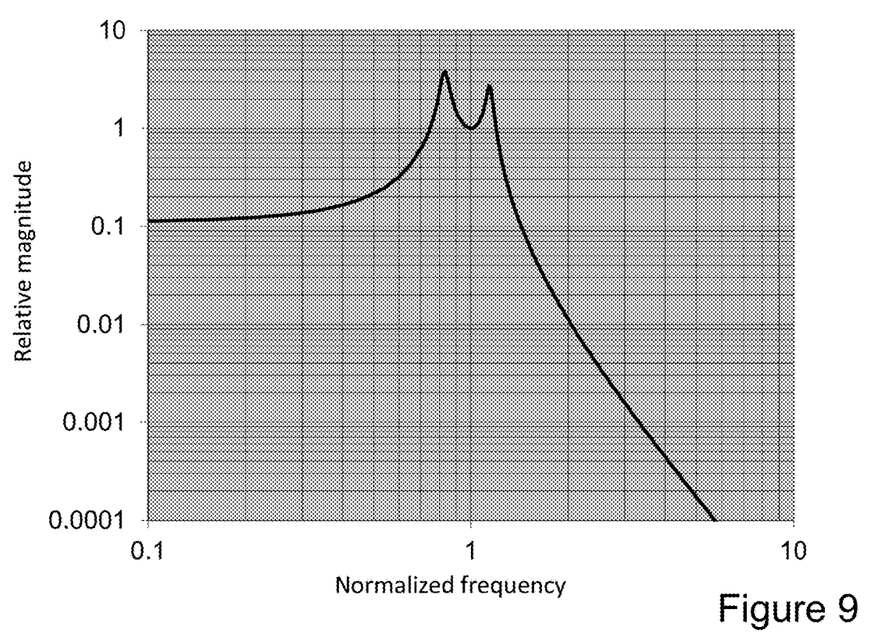
FIG. 9 shows an exemplary closed loop transfer function for amplitude.
Figure 10:
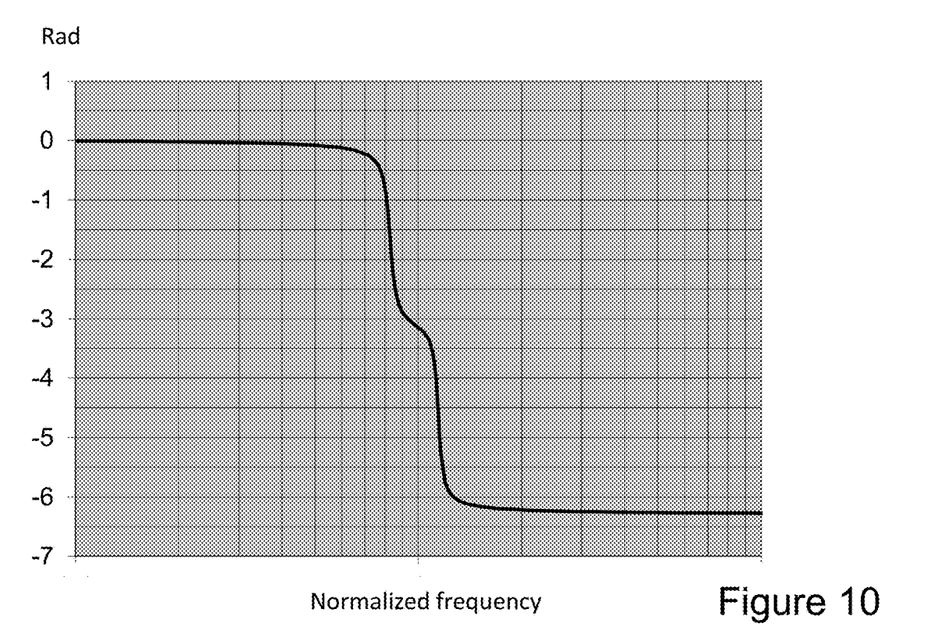
FIG. 10 shows an exemplary closed loop transfer function for phase.

An advantageous low-pass transfer function for the controller may have the form:

$$H_{LP}(s) = \frac{K}{1 + s/Q_e + s^2} \quad (7)$$

where $Q_e$ is the Q-value of the low-pass filter and K is the amplification at low frequency. $Q_e$ is preferably in the range from 3 to 10 and K is in the range from 0.1 to 0.3. When the transfer function of the equation (7) is used in a feed-back system and the sign of the feed-back is selected positive, one obtains a very high damping closed loop transfer function as shown in FIG. 9 for the amplitude and in FIG. 10 for the phase. It may be seen that the resulting amplitude response has two peaks around the resonant frequency of the mechanical resonator, but they are not so high as to compromise the damping of the original very high Q-value resonance.

As a further advantage, it is seen that due to the proposed configuration, the matching of the peak of the controller response to the mechanical resonance frequency does not have to be very precise. 10% deviation during operation doesn't cause a noticeable effect and deviation as high as 30% may still be useful. The resonant frequency in which the transfer function of the third resonator (controller 57) reaches its highest value may deviate to some extent from the resonant frequency of the second mechanical resonator R2. Advantageously deviation remains under 20% such that the resonant frequency of R2 remains in the range of 80% to 120% of the resonant frequency of R1. However, it has been noted that even 50% deviations, i.e. R2 values in the range of 50% to 150% of the resonant frequency of R1 are applicable.

Due to the tendency of the additional resonant frequencies to appear in higher frequencies, the low-pass filter has been seen to operate very well in the feed-back loop, because the fast roll-off efficiently eliminates the unwanted elements from the signal. By adjusting the amplification of the controller low enough, it is also possible to eliminate the instability in the low frequency range. A damping signal that provides the correct phase shift and can be very strongly amplified is achieved.

The same concept may be applied to other types of filters with frequency response, as well. In another embodiment, the controller 57 may be implemented with a high-pass filter. In this case, the phase shift in the feed-back loop from the mechanical resonator is $-\pi/2$ and the phase shift of the high-pass filter is $+\pi/2$. This means that in the case of low-pass filter, other aspects of the closed loop may be designed in the similar manner as in the low-pass filter case, but the sign of the feed-back must be set to be negative. A transfer function for the high-pass configuration may have the form:

$$H_{HP}(s) = \frac{Ks^2}{1 + s/Q_e + s^2} \quad (8)$$

In another embodiment, the controller 57 may be implemented with a combination of a band-pass filter and an all-pass filter. In this case, the phase shift in the feed-back loop from the mechanical resonator is $-\pi/2$, and the phase shift of the band-pass filter is 0. The band-pass filter provides appropriate frequency response characteristics, but appropriate phase shift values cannot be provided. The phase shift of an all-pass filter is $-\pi/2$ with no effect on roll-off, so with an added all-pass filter the desired frequency response characteristics can be maintained, and the correct phase shift provided, when the sign of the feed-back is set positive. Other aspects of the closed loop may be designed in the similar manner as in the low-pass filter case. A transfer function for the band-pass/all-pass configuration may have form $$H_{BP-AP}(s) = \frac{Ks}{1 + s/Q_e + s^2} \cdot \frac{1-s}{1+s} \quad (9)$$

In a further embodiment, the controller 57 may be implemented with an all-pass filter that has the resonating or even a flat frequency characteristics. In this case, the phase shift in the feed-back loop from the mechanical resonator is $-\pi/2$, and the phase shift of the all-pass filter is $-\pi/2$. Appropriate phase shift can thus be achieved by setting the sign of the feed-back positive. Other aspects of the closed loop may be designed in the similar manner as in the low-pass filter case.

In the above embodiments, damping to the second resonator channel is achieved with a feed-back loop that efficiently eliminates or at least alleviates spurious resonance effects in the second resonator. For a person skilled in the art it is clear that also some other type of feed-back controllers can be used, as long as the required level of damping and appropriate stability to spurious mechanical resonances can be achieved.

Figure 11:
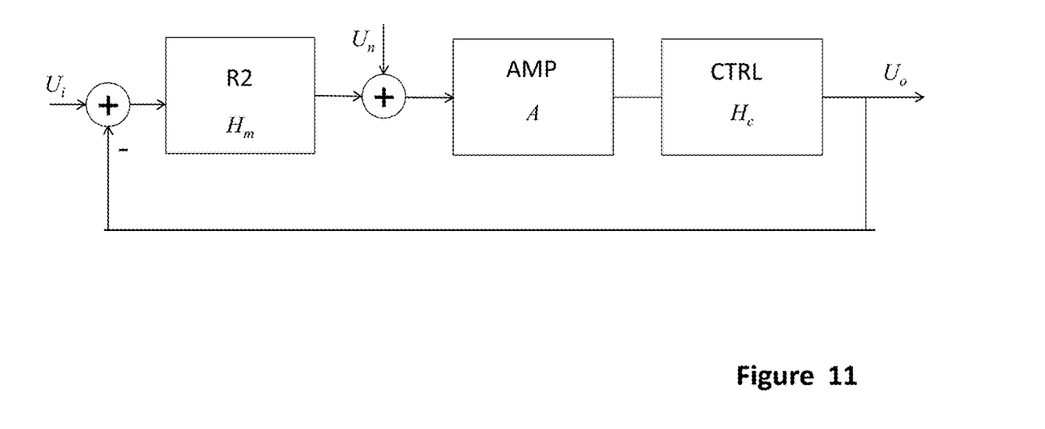
FIG. 11 shows an exemplary feed-back loop configuration.

The described configuration solves or at least alleviates many of the problems of a conventional micromechanical sensor devices discussed above. The signal to noise-ratio of a feed-back damped gyroscope with essentially coinciding first and second resonance frequencies is greatly improved since in the proposed configuration, the amplifier noise is not amplified by the mechanical resonance. The feed-back loop may be modeled with a configuration of FIG. 11, where $U_i$ is a mechanical input signal converted to equivalent voltage signal, $H_m$ is a mechanical transfer function of the secondary resonator, $U_n$ is noise voltage reduced to the amplifier input, A is the amplification in the pre-mplifier, $H_e$ is a transfer function of the controller and $U_0$ is the output voltage. The output voltage can then be written as $$U_o = \frac{AH_c}{1 + AH_cH_m} U_n + \frac{AH_cH_m}{1 + AH_cH_m} U_i \quad (10)$$

In equation (10) the first term is the noise voltage at the output and the second term is the signal voltage at the output. Signal to noise ratio of the feed-back system can be written as:

$$S/N|_{FB} = \quad (11)$$

$$|H_m| \cdot \frac{|U_i|}{|U_n|} = |H_m| \cdot S/N|_{CONV} = \frac{Q_m \cdot S/N|_{CONV}}{\sqrt{Q_m^2\left[1 - \left(\frac{\omega}{\omega_0}\right)^2\right]^2 + \left(\frac{\omega}{\omega_0}\right)^2}}$$

where $S/N|_{CONV}$ is the signal to noise ratio of a conventional gyroscope without any resonance gain.

At the secondary resonance frequency $\omega=\omega_0$ the signal to noise ratio is improved with a factor of the mechanical quality factor of the second resonator $Q_m$:

$$S/N|_{FB} = Q_m \cdot S/N|_{CONV} \quad (10)$$

Slightly away from the resonance frequency equation (10) becomes $$S/N|_{FB} = \frac{\omega_0 \cdot S/N|_{CONV}}{|\omega - \omega_0|} \quad (11)$$

With typical resonance frequency and bandwidth values, the computed signal to noise ratio of the improved sensor device with the described feed-back loop is more than 100 times better than the signal to noise ratio in conventional sensor device configurations.

It is noted that with the proposed configuration, sensitivity to mechanical shocks, vibration and sound waves is improved. In microelectromechanical gyroscopes, the secondary resonance is the main source for the sensitivity to external impulses. One known mechanism for this sensitivity is direct coupling of external vibration to the secondary resonance mode at the secondary resonance frequency. External vibration close to the resonance frequency will cause a large secondary vibration and a corresponding large electrical signal, which easily overloads the amplifier and disturbs detection. More efficient damping in the secondary frequency significantly reduces effects of direct coupling.

Also the vibration sensitivity behavior of the sensor device is much improved. There is practically no delta-f effect since there is no more peak in the frequency response at delta-f as in the conventional gyro. In addition, the effect of direct coupling to the secondary resonator is greatly reduced since now both the direct coupling and the Coriolis signal benefit from the same resonance gain. In the conventional gyroscope configurations, the gain for the direct coupling is at least 100 times larger than for the Coriolis signal.

The zero point stability is nearly as good as with a conventional gyroscope since the phase doesn't change too much as a function of frequency near the secondary resonance frequency. With a simple controller function (differentiator) the closed loop frequency response of the damped resonator is $$H(s) = \frac{Ks}{1 + Ks + s^2} \quad (12)$$

where K is the gain at low frequency. The slope of the phase is $$\frac{\Delta\varphi}{\Delta\omega} = \frac{1 + \omega^2}{(1 - \omega^2)^2 + K^2\omega^2} \cdot K \quad (13)$$

At secondary frequency the ratio will be $$\frac{\Delta\varphi}{\Delta\omega} = \frac{2}{K}. \quad (14)$$

For a controller with peaked frequency response the slope will be $$\frac{\Delta\varphi}{\Delta\omega} = \frac{2K}{Q_e}. \quad (15)$$

A practical number for this slope is 2. This is over 100 times smaller than the value of equation (5) but more than ten times larger than the value of equation (6) with the same parameters.

As a further improvement, in the selected quality factor range in the combination of the feed-back loop and the second mechanical resonator, the initially coinciding primary and secondary frequencies may be allowed to drift separately without additional means to calibrate or compensate their tracking error. The frequency of a MEMS resonator is determined by the mass (m) and spring constant (k).

$$f = \frac{1}{2\pi}\sqrt{\frac{k}{m}} \quad (16)$$

In a gyroscope, the mass can be considered constant. The spring constant depends on the geometrical dimension of the spring, and on the Young's modulus. A resonator may also be based on a moment of inertia and torsion spring constant, which depends on the shear modulus. It is well known that the temperature coefficient of a MEMS resonator due to elastic constants is about −30 ppm/° C.

If the spring is under constant tension or compression the spring constant will change:

$$k = \frac{k_0}{1 - c \cdot \varepsilon} \quad (17)$$

where k is the new spring constant under compression, $k_0$ is the original spring constant and e is the compressive strain in the spring. The coefficient c depends on dimensions of the spring.

The spring constant may also change if there is an electric field present around the moving part of the resonator. If a plate capacitor is connected to the moving end of the spring so that the motion will change the dielectric gap the new spring constant will be:

$$k = k_0 - \frac{\varepsilon_0 A U^2}{d^3} \quad (18)$$

where $\varepsilon_0$ is the dielectric coefficient, A is the capacitor area, U is the applied voltage over the capacitor and d is the dielectric gap.

As discussed above, there are two types of electrostatic/capacitive transducers. The dielectric gap modulated type transducer is affected by the applied voltage according to equation (18). The area modulated type is not affected by the applied voltage and equation (18) does not apply for this type. Applied voltage doesn't affect the resonance frequencies of gyros where the excitation and detection is done with piezoelectric transducers.

Conventional electrostatic/capacitive MEMS gyroscopes comprise an area modulation type transducer for excitation of the primary motion because this type allows linear excitation of high amplitude vibration. The resonance frequency of this kind of transducer is determined by the elastic constants of silicon and the geometrical shape of the resonator.

The dielectric gap modulation type transducer is conventionally used as a secondary detection transducer due to its high sensitivity. However the resonance frequency is strongly affected by the applied detection bias voltage according to equation (18) and the secondary resonance frequency does not appropriately track the primary frequency when e.g. the temperature is changed.

Accordingly, tracking error between the primary and secondary resonators may be appropriately controlled without additional means by using area modulated type of capacitive/electrostatic transducers in the primary and the secondary resonator. Alternatively, the first and the second resonator can be designed so that the ratio of the mechanical and electrostatic contributions to the spring constant is as equal as possible. Alternatively, piezoelectric transducers may be applied.

Advantageously, the resonance frequencies of the first and second mechanical resonators may be designed to behave similarly over changes in ambient environment.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A sensing device comprising a micromechanical gyroscope, the gyroscope comprising:
a first mechanical resonator for drive mode vibration;
a second mechanical resonator coupled to the first mechanical resonator for sense mode vibration corresponding to an angular velocity, wherein a resonance frequency of the first mechanical resonator and a resonance frequency of the second mechanical resonator are initially set to essentially coincide; and
a damping feed-back loop connected to the second mechanical resonator for damping the sense mode vibration of the second mechanical resonator, the damping feed-back loop comprising a signal processing filter that has a resonant frequency characteristic that coincides with the resonance frequency of the second mechanical resonator, wherein a sign of the signal processing filter is selected such that a phase shift of the damping feed-back loop is either 0 or −π, and an electrical Q value, which is an electrical quality factor, of the signal processing filter is in a range between 3 to 10.

2. A sensing device according to claim 1, wherein the initial frequency separation between the resonance frequency of the first mechanical resonator and the resonance frequency of the second mechanical resonator is in the range of 0 to 0.05.

3. A sensing device according to claim 1, wherein the resonance frequencies of the first and second mechanical resonators are designed to behave similarly over changes in environment.

4. A sensing device according to claim 1, wherein the second mechanical resonator comprises a first transducer and a second transducer, wherein the first transducer and the second transducer are area modulated type of capacitive or electric transducers.

5. A sensing device according to claim 4, wherein deviation of the resonant frequency characteristic from the resonance frequency of the first mechanical resonator is less than 50%.

6. A sensing device according to claim 1, wherein the second mechanical resonator comprises a first transducer and a second transducer, wherein the first transducer and the second transducer are piezoelectric transducers.

7. A sensing device according to claim 1, wherein a loop gain of the damping feed-back loop for frequencies below the resonant frequency of the first mechanical resonator is in the range 0.1 to 0.3.

8. A method of manufacturing a sensing device comprising a micromechanical gyroscope, the gyroscope comprising a first mechanical resonator for drive mode vibration and a second mechanical resonator coupled to the first mechanical resonator for sense mode vibration corresponding to an angular velocity, the method comprising:
 initially setting a resonance frequency of the first mechanical resonator and a resonance frequency of the second mechanical resonator to essentially coincide; and
 connecting a damping feed-back loop to the second mechanical resonator, the damping feed-back loop comprising a signal processing filter that has a resonant frequency characteristic at the resonance frequency of the second mechanical resonator, wherein a sign of the signal processing filter is selected such that a phase shift of the damping feed-back loop is either 0 or $-\pi$, and an electrical Q value, which is an electrical quality factor, of the signal processing filter is in a range between 3 to 10.

* * * * *